Figure 1:
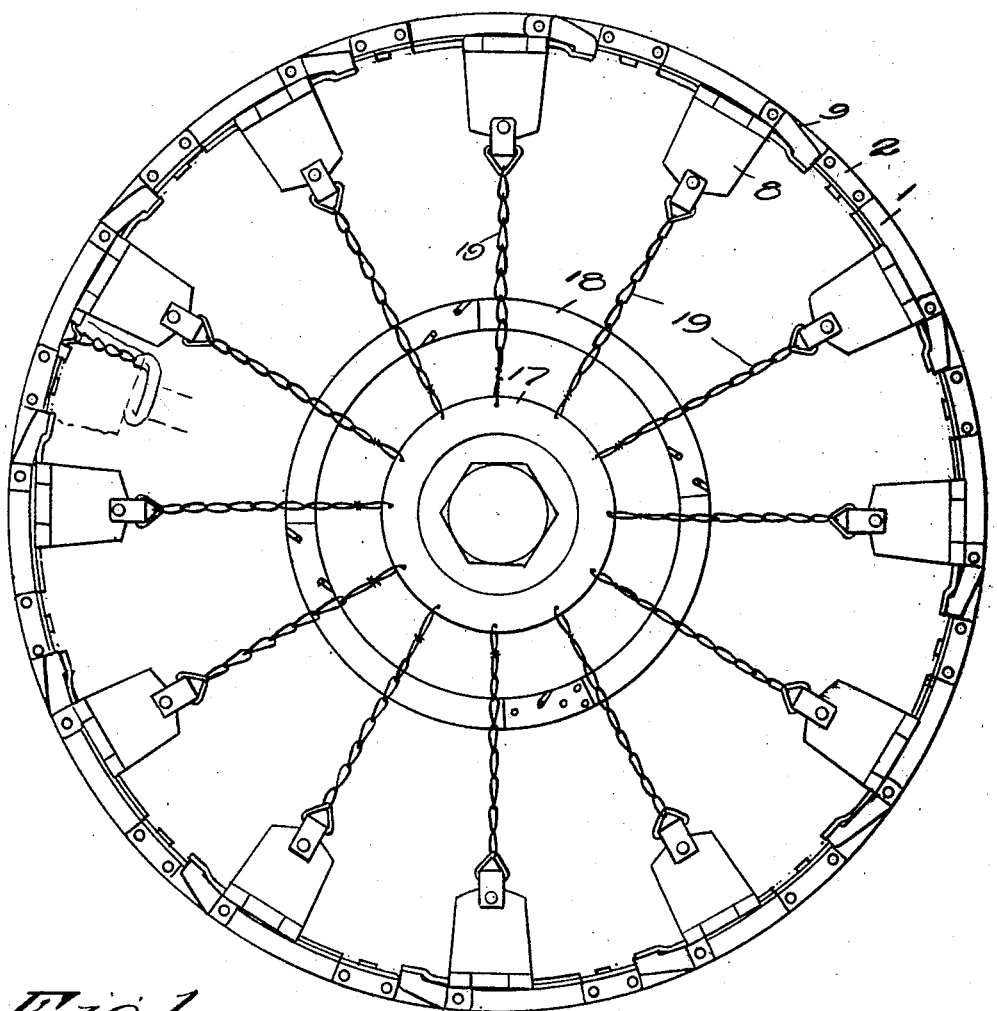

J. FRIESEN.
TIRE PROTECTOR.
APPLICATION FILED MAR. 20, 1919.

1,324,658.

Patented Dec. 9, 1919.
2 SHEETS—SHEET 1.

John Friesen
Inventor
By Geo. P. Kimmel
Attorney

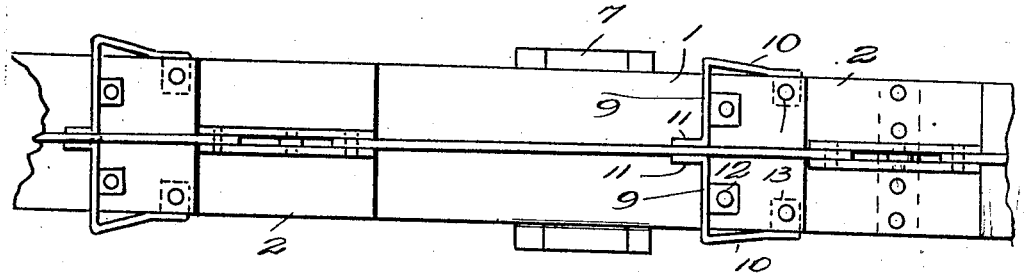
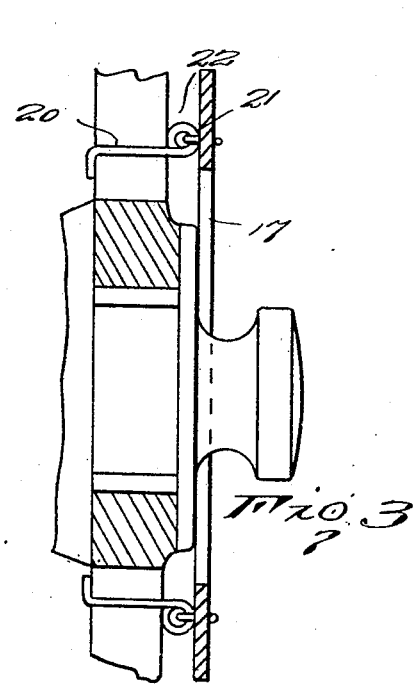
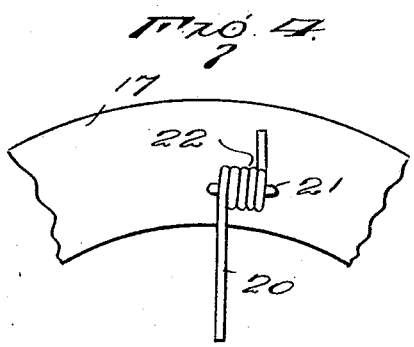
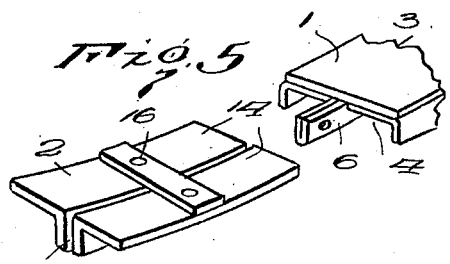
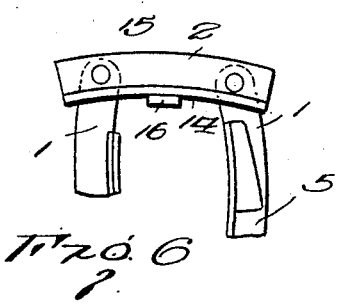

UNITED STATES PATENT OFFICE.

JOHN FRIESEN, OF LEHIGH, KANSAS.

TIRE-PROTECTOR.

1,324,658.  Specification of Letters Patent.  Patented Dec. 9, 1919.

Application filed March 20, 1919. Serial No. 283,734.

*To all whom it may concern:*

Be it known that I, JOHN FRIESEN, a citizen of Russia, residing at Lehigh, in the county of Marion and State of Kansas, have invented certain new and useful Improvements in Tire-Protectors, of which the following is a specification.

This invention relates to an improved tire protector and the principal object of the invention is to provide a tire protector which will serve to prevent the tire from skidding or slipping on a wet or otherwise slippery road bed and will further serve to protect the tire from punctures.

Another object of the invention is to so construct this tire protector that it may be easily and quickly removed or put in place, the tread portion of the protector being formed of a plurality of sections or links pivotally connected so that the protector may be folded into a compact mass and stored away in a small space.

Another object of the invention is to so construct the protector that the various parts may be formed of sheet metal, stamped and bent to the proper shape, the various parts being securely fastened together thus forming a strong and durable protector.

This invention is illustrated in the accompanying drawings, wherein—

Figure 1 is a view showing the improved tire protector in side elevation, and showing the protector in place upon a wheel, Fig. 2 is a fragmentary plan view of the tread portion of the protector, Fig. 3 is a fragmentary sectional view showing the manner of connecting the hub plate of the protector with the wheel, Fig. 4 is a fragmentary view in elevation showing the manner of connecting the wheel engaging arm with the hub plate of the protector, Fig. 5 is a perspective view showing two of the sections or plates forming the tread portion of the protector, Fig. 6 is a view in elevation showing the section of the tread portion in a folded position, and Fig. 7 is a sectional view of one of the smaller sections or links of the tread portion of the protector.

This tire protector is provided with a tread portion which extends about the tire and is formed of a plurality of relatively large and small links or sections 1 and 2 which sections are pivotally connected and produce a tread portion which will fit closely about the tire when in place. The larger links or sections 1 are formed of inner and outer plates 3 and 4. the outer plates being crimped longitudinally to provide a road engaging rib 5 to prevent tire skidding and to further provide ears 6 through the medium of which the large links may be pivotally connected with the smaller links. The inner plate 3 has side extensions or arms bent back upon themselves and secured between the inner and outer plates to provide hinge ears 7 so that the leaves 8 may be hingedly connected with the links 1. Cleats 9 extend transversely of the links 1 to permit the protector to obtain a firm grip upon a roadbed and prevent the wheel from rotating upon a slippery roadbed without moving the car. These cleats are provided with side arms 10 and with extensions 11 which extensions will be secured to the rib 5 and are further provided with ears 12 and 13, the ears 12 being secured to the outer face of the plate 4 and the ears 13 being secured between the inner and outer plates. Therefore, these cleats will be securely held in place and the fasteners or rivets for the cleats will serve as additional means for securing the inner and outer plates 3 and 4 together.

The smaller links 2 are formed of sheet metal plates 14 which have their inner portions bent to provide the rib 15 forming a continuation of the rib 5 when the smaller plates are connected with the larger plates through the medium of rivets passing through the extension 6 of the rib 5. These plates 14 are connected and braced by the cross strip 16 extending as shown in Fig. 5 thus securely connecting the side plates and preventing them from spreading. By having the links or sections 2 small in comparison to the sections or links 1 the tread protector may be folded into a very compact mass and stored in a small space. It will be further noted that due to the construction clearly shown in Figs. 5 and 6 the links or sections may be folded either inwardly or outwardly and the sections may rest one upon the other when in a folded position.

In order to hold this protector or guard in place upon the tire there have been provided rings or bands 17 and 18, the hub band or ring 17 being preferably of a single piece and the band 18 being preferably formed of a plurality of sections. When in place, the hub band 17 fits against the outer faces of the spokes and the band 18 will fit against the inner faces of the spokes. The chains 19 leading from the arms 8 are connected with the bands 17 and 18 and the armor will be securely held in place and prevented from having side play which might tend to let the armor slip from the tire. In order to hold the hub band 17 against moving longitudinally off the hub there has been provided engaging arms or hooks 20 pivotally mounted as shown at 21 and coiled to provide springs 22 thus giving a firm grip when in place as shown in Fig. 3. The tire protector or armor will therefore be securely held in place when in operative position upon the wheel and will be held against transverse movement and also against movement circumferentially of the wheel. While this tire protector will be securely held in place when in use it may be easily removed by disconnecting the fasteners or hooks 20 and removing the protector from about the wheel. When removed, it can be collapsed and folded in a compact mass and then put away until again needed for use.

What is claimed is:—

1. A tire protector comprising a tread portion formed of a plurality of relatively large and small sections, one set of sections being provided with inner and outer plates, the outer plates being crimped to provide longitudinally extending ribs extending beyond the end of the inner plate and the inner plate being provided with side arms bent to provide hinge ears and having their free ends secured between the inner and outer plates, a second set of sections being formed of side plates having their inner side portions bent to provide flanges pivotally connected with the extended end portions of the ribs of the first mentioned sections and providing continuations of the ribs when the protector is in place, arms pivotally connected with the hinge ears, and fastening means connected with the arms.

2. A tire protector comprising a tread portion having a plurality of sections, certain of the sections being provided with inner and outer plates, the outer plates being provided with longitudinal extending ribs extended beyond the end of the other plate to provide hinge ears, the remaining section being formed of side plates having their inner side portions provided with outstanding flanges pivotally connected with the extensions of the ribs, and means for securing the protector about a tire.

3. A tire protector comprising a plurality of tread engaging sections pivotally connected, certain of said sections being each formed of inner and outer plates, the outer plates having anti-slipping means for engaging a roadbed, transversely extending arms bent back upon themselves and secured between the inner and outer plates to provide hinge ears, cleats extending transversely of the outer plate and secured thereto and having their outer end portions extending longitudinally of the outer plate and terminating in securing ears fastened between the plates, and means connected with the hinge ears for holding the protector about a tire.

4. A tire protector comprising a tire encircling structure, securing bands for engaging the inner and outer sides of wheel spokes, eyes carried by one of said bands, fastener elements for engagement with the spokes of a wheel and formed of resilient material and bent about the eyes to provide spring elements for the fasteners, and means connecting the bands with the tread engaging structure.

5. A tire protector comprising a tread engaging structure, and means for holding the tread engaging structure in place including bands, eyes carried by one of said bands, fasteners for engagement with the spokes of a wheel formed of resilient material coiled to provide spring elements receiving the eyes to movably connect the fasteners with the bands, the free end portions of the fasteners being formed to provide spring elements for engaging the spokes of a wheel, and means for connecting the bands with the tread engaging structure.

6. A tire protector comprising a tread encircling structure formed of a plurality of loosely connected elements, and means for holding the tread engaging structure in place including a band for fitting about the hub of a wheel, means connecting the band with the tread engaging structure and resilient spoke engaging fastener elements having loose connection with the band.

In testimony whereof, I affix my signature hereto.

JOHN FRIESEN.